US007125234B2

(12) United States Patent
Scholz et al.

(10) Patent No.: US 7,125,234 B2
(45) Date of Patent: Oct. 24, 2006

(54) SET OF COMPACTION RAMS AND/OR DIE-PLATES FOR A TABLETTING MACHINE

(75) Inventors: Detlev Scholz, Hamburg (DE); Jürgen Hinzpeter, Schwarzenbek (DE); Ulrich Zeuschner, Schwarzenbek (DE); Ingo Schmidt, Schwarzenbek (DE); Jan Naeve, Schattin (DE); Reno Schiebe, Wittenburg (DE); Michael Gruber, Trittau (DE)

(73) Assignee: Fette GmbH(DE)

( * ) Notice: Subject to any disclaimer, the term of this patent is extended or adjusted under 35 U.S.C. 154(b) by 210 days.

(21) Appl. No.: 10/350,510

(22) Filed: Jan. 24, 2003

(65) Prior Publication Data

US 2003/0143300 A1 Jul. 31, 2003

(30) Foreign Application Priority Data

Jan. 25, 2002 (DE) ................................ 102 02 820

(51) Int. Cl.
*B29C 43/08* (2006.01)

(52) U.S. Cl. ...................... 425/167; 425/345; 425/171; 700/197; 700/206

(58) Field of Classification Search ................ 425/167, 425/150, 171, 78, 344–345, 135; 700/206, 700/197
See application file for complete search history.

(56) References Cited

U.S. PATENT DOCUMENTS

| | | | | |
|---|---|---|---|---|
| 4,518,338 A * | 5/1985 | Hehl | .......................... | 425/183 |
| 4,720,253 A * | 1/1988 | Koentges | .................... | 425/150 |
| 5,211,964 A * | 5/1993 | Prytherch et al. | ........... | 425/140 |
| 5,246,362 A * | 9/1993 | Kobayashi et al. | ......... | 425/135 |
| 5,894,005 A * | 4/1999 | Steel et al. | ................. | 425/135 |
| 6,122,565 A * | 9/2000 | Wenning et al. | ............ | 700/206 |

FOREIGN PATENT DOCUMENTS

| | | |
|---|---|---|
| EP | 0 620 108 | 10/1994 |
| GB | 2276476 A * | 9/1994 |

* cited by examiner

*Primary Examiner*—Duane Smith
*Assistant Examiner*—Thu Khanh T. Nguyen
(74) *Attorney, Agent, or Firm*—Peter J. Bilinski

(57) ABSTRACT

A set of compaction rams and/or die-plates for a tabletting machine has all of the compaction rams and/or die-plates of the set furnished with a code containing at least the following information: (a) a label for the set of compaction rams and die-plates; (b) an individual label for each compaction ram and/or die-plate within the set; (c) data effective to critically dimension the compaction ram and/or die-plate which contains the code; and (d) data containing service life information for the compaction ram and/or die-plate which contains the code.

5 Claims, 2 Drawing Sheets

SET OF COMPACTION RAMS AND/OR DIE-PLATES FOR A TABLETTING MACHINE

CROSS-REFERENCE TO RELATED APPLICATIONS

This application claims priority from German Application Ser. No. 102 02 820.6 filed Jan. 25, 2002 and entitled A SET OF COMPACTION RAMS AND/OR DIE-PLATES FOR A TABLETTING MACHINE.

FIELD OF THE INVENTION

This invention relates generally to the field of tabletting machine, and more particularly to a set of set of compaction rams and/or die-plates in which every ram and/or die-plate in the set contains coded information.

BACKGROUND OF THE INVENTION

Tabletting machines in the form of rotary presses have a die-disk driven about a vertical axis which receives die-plates arranged on a circle in appropriate die-bores. Couples of compaction rams, which are actuated by control cams and pressure rollers if rotating along with the rotor, rotate in synchronism with the disk. Before being introduced into the die-plates, the upper rams are filled with an appropriately proportioned powder by means of a suitable loading device. Subsequently, the material is compressed to obtain a desired thickness (web height) by moving the compaction rams towards each other.

The control of the tabletting machine and its supervision, i.e. the control of its number of revolutions, the regulation of its filling level, the compaction force of the rams, the regulation of web height, and sampling, etc., is accomplished via a process control computer.

Different tablet shapes can be produced by making changes to the set of compaction rams and die-plates, which are known to be complementary. EP 0 620 108 A1 has made known to provide the shank of at least one compaction ram of a set of compaction rams with a recess in which a data carrier is received. The data carrier, for example, may be a so-called chip in which electronically predetermined information is stored, e.g. the label for the type of compaction tool, its previous service life, its residual tool life or also tolerances of the set. The label described may then be read by means of a reading device mounted at the location of the tabletting machine and may be automatically transferred to the process control computer. The process control computer will then take into account such information in selecting the operation program for the tabletting machine.

In the known prior art, it is impossible to identify an individual compaction ram or individual die-plate. In the operation of a tabletting machine, it frequently happens that individual die-plates and/or compaction rams need to be exchanged. The constant quality of the tablets may then be risked unless particular provisions are made.

What was stated for compaction rams also applies to die-plates. It is understood that each position of a die-plate or couple of rams is also identified in relation to its location in the rotor of the tabletting machine. This is commonly done by means of the process control computer. An identification is not made or is unnecessary with regard to the position of the compaction ram and/or die plate.

SUMMARY OF THE INVENTION

It is the object of the invention to provide a set of compaction rams and/or die-plates in which an exchange of individual rams or die-plates does not result in a risk to the quality of the tablets being manufactured.

Briefly stated, a set of compaction rams and/or die-plates for a tabletting machine has all of the compaction rams and/or die-plates of the set furnished with a code containing at least the following information: (a) a label for the set of compaction rams and die-plates; (b) an individual label for each compaction ram and/or die-plate within the set; (c) data effective to critically dimension the compaction ram and/or die-plate which contains the code; and (d) data containing service life information for the compaction ram and/or die-plate which contains the code.

According to an embodiment of the invention, an apparatus includes a set of compaction rams and/or die-plates for a tabletting machine, wherein all compaction rams and/or die-plates of the set have a code containing at least the following information: (a) a label for the set of compaction rams and die-plates; (b) an individual label for each compaction ram and/or die-plate within the set; (c) data effective to critically dimension the compaction ram and/or die-plate which contains the code; and (d) data containing service life information for the compaction ram and/or die-plate which contains the code.

DETAILED DESCRIPTION OF THE PREFERRED EMBODIMENT

Figure 1:
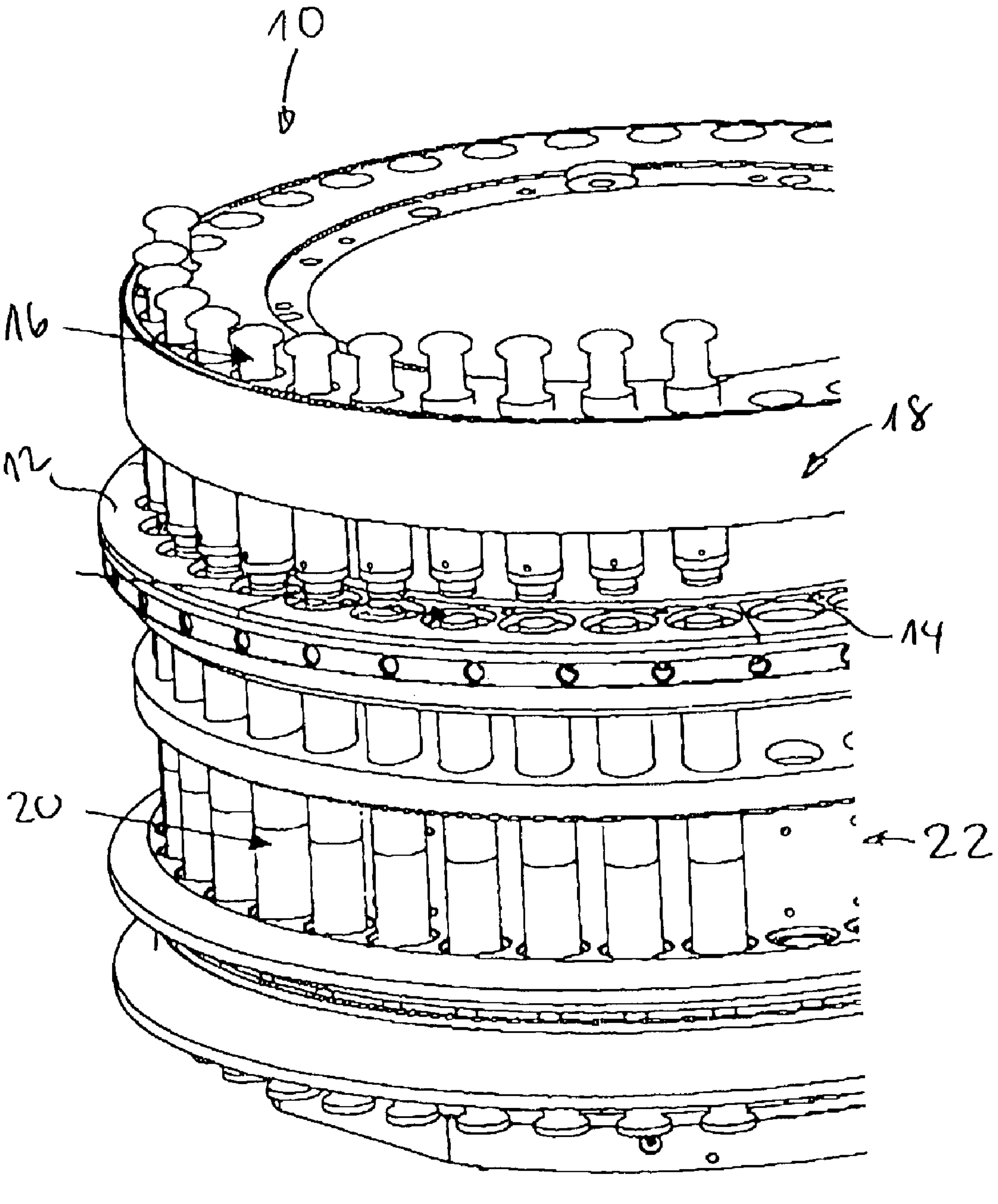
FIG 1 PRIOR ART
FIG. 1 shows a rotor arrangement for a rotary tabletting machine according to the prior art.

Referring to FIG. 1, the rotor arrangement is designated with reference numeral 10. Rotor arrangement 10 includes a die-plate 12 with a number of die-bushings 14. Upper rams 16 are guided in upper guiding means 18 while lower rams 20 are guided by lower guide means 22. The rotor arrangement 10 is rotated about a vertical axis by suitable driving means (not shown) and suitable support means (also not shown). This is general prior art.

Figure 2:
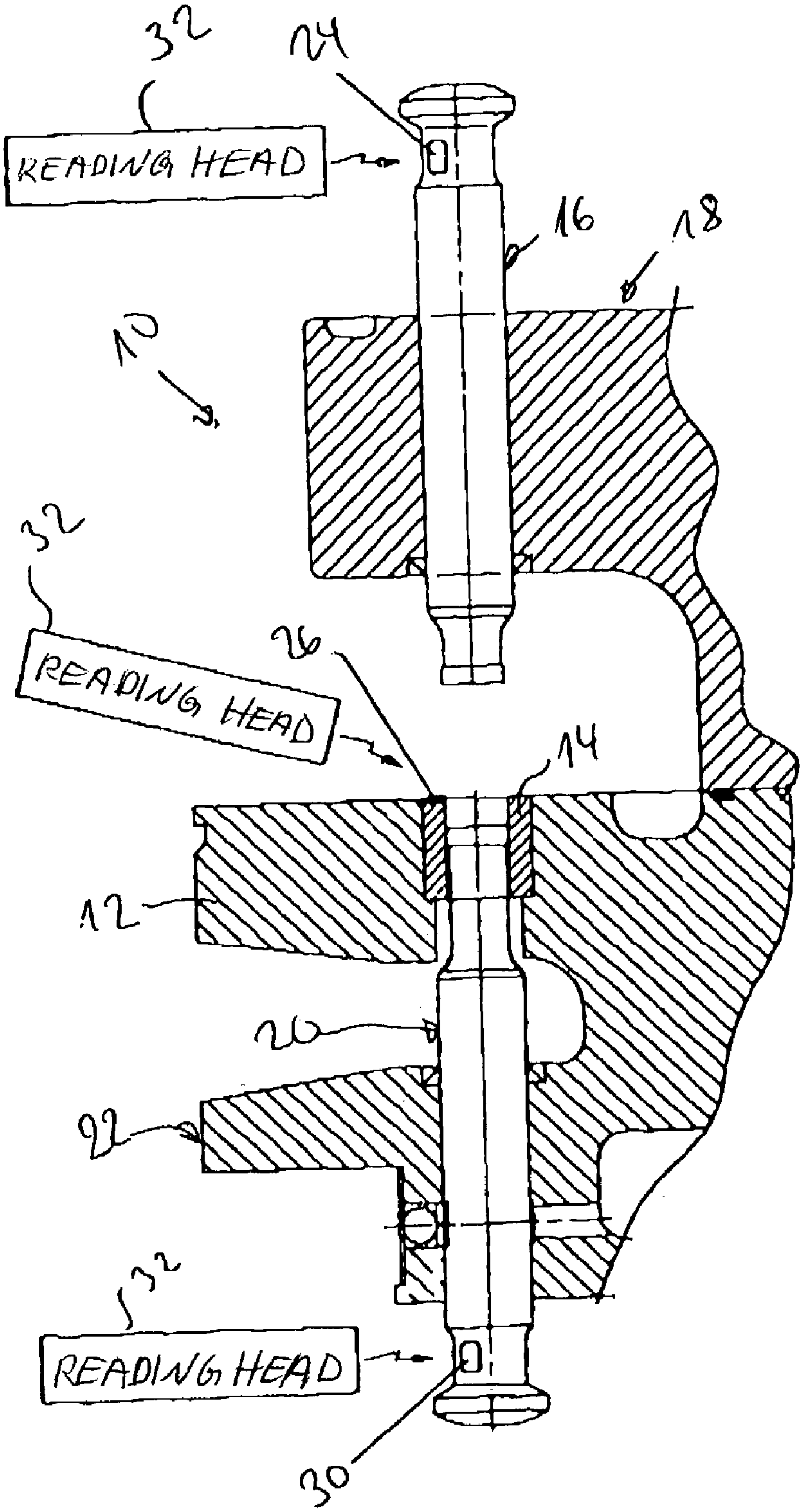
FIG. 2 shows an embodiment of the present invention.

Referring to FIG. 2, one upper ram 16 and one lower ram 20 are shown as well as a die-bushing 14. These parts each preferably include code storing means 24, 26, and 30 which are suited to store a code. This code may include data characteristics for the set of upper rams, lower rams 20 and/or the die-bushings 26. The code may further include data characteristics for individual upper rams or lower rams 16, 20 or individual bushings 14. These characterizing data may refer to the dimensions or tolerances of these parts or the like. Each of the upper and lower rams 16, 20 and of the bushings 14 is provided with such codes including general data referring to the set of the parts and to the individual part as well.

Within the rotor arrangement 10 or outside thereof the means 24, 26, 30 can be read by a reading head 32 which in FIG. 2 is shown threefold. Generally, only one reading head would be necessary. The reading head 32 may be connected with a computer (not shown) for the operation and/or control of the rotary press.

In the invention, all compaction rams and/or die-plates of a set are provided with the code. Such code includes at least the following information: (1) a label for the set of compaction rams and/or die-plates, (2) an individual label for each compaction ram or die-plate, (3) the data to critically dimension the compaction ram or die-plate, and (4) the service life.

The first item, the label, concerns the type of the compaction tool or die-plate. In the prior art, such a label is required to be provided only for one compaction ram of a set of rams. In the present invention, however, an individual label is added to each compaction ram or each die-plate. Thus, each compaction ram or each die-plate within a set is given an individual label which is characteristic of the individual ram only. A critical dimensioning of the individual compaction ram or die-plate is included as another item of information. In the case of compaction rams, it is primarily their length which is of importance because the height of web of a tablet or the compaction force is influenced by the length of the compaction ram. For example, in a set of compaction rams under operation, if a compaction ram is exchanged and is replaced with another compaction ram made available by the manufacturer this new compaction ram is also provided with a code and contains an indication about its precisely measured length. Confronting the individual ram lengths makes it possible to re-classify the assignment of upper and lower rams to keep the parameters desired for the tablet constant.

Finally, the information also includes an indication about the service life of the compaction ram. If the compaction ram is a newly manufactured one its service life will be zero, which fact is appropriately incorporated into its code.

In the preferred embodiment of the invention, the reading head is disposed in the tabletting machine in such a way that if the rotor receiving the compaction rams rotates about its axis, all of the information is read from the compaction rams or die-plates and is transferred to the process control computer. Errors due to a wrong readout or wrong transfer to the process control computer while exchanging the compaction ram and/or die-plate can no longer occur. If a transponder is used, the rotational position of the compaction ram is presumed to be uncritical in its receptacle relative to the reading head. However, if the code is applied optically it might possibly be an advantage for the code to be applied to the circumference, e.g., of the shank of the compaction ram, at several points so that the rotational position does not matter. Alternatively, however, it would be imaginable to provide for the compaction rams to be rotatable if this is significant for readability.

As was mentioned, the information stored in the compaction rams and die-plates is processed internally by means of the process computer. The information may also be processed externally and may be linked to other machine or batch parameters, and may be evaluated.

It is also possible to change the ram assignment while exchanging one or more rams, and to arrange the upper and lower rams with respect to each other so as to compensate for deviations from the ideal length of the ram.

Reading the information from all compaction rams of a set continuously and repeatedly allows a user to ascertain on which position of the rotor of the tabletting machine a compaction ram or couple of compaction rams or a die-plate needs to be substituted.

The labeling of the compaction rams or die-plates may be done optically, e.g., by means of a laser, or by punching in a matrix code. Alternatively, a so-called transponder may also be used which is mounted in a recess of the compaction ram or die-plate, for example. The label is then identified or read in an analog manner, i.e., optically or electronically.

The information is typically read by the user of the tabletting machine. The reading device required, which is equipped with an appropriate reading head, is connected to the process control computer via cables so that the respective data of the compaction ram or die-plate which has been exchanged will be automatically processed and taken into account for the control of the machine.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An apparatus comprising a set of compaction rams and dies for a rotary tabletting machine having at least one rotor that accommodates the set of compaction rams and at least one die plate that receives said dies in bores disposed thereabout, wherein at least one of the set of all compaction rams and all dies on the at least one die plate have a code containing at least the following information:

(a) a label for the set of compaction rams and dies, (b) an individual label for each compaction ram and die within the set, (c) data effective to critically dimension the compaction ram and die which contains the code, and (d) data containing service life information for the compaction ram and die which contains the code, said apparatus further including a single reading head connected to a process computer of the tabletting machine via a signal cable, the single reading head being disposed within the tabletting machine and the code being located on the at least one of the set of all compaction rams and all dies in such a way that if the at least one rotor with the accommodated compaction rams and dies rotates about its axis all of the information in the code can be read from the compaction rams or dies.

2. An apparatus according to claim 1, wherein the information in the code is adapted to be erased and/or overwritten.

3. An apparatus according to claim 2, wherein encoding is accomplished by a transponder which is mounted in a recess of the compaction ram or die-plate.

4. An apparatus according to claim 1, wherein encoding is accomplished by a transponder which is mounted in a recess of the compaction ram or die-plate.

5. An apparatus according to claim 1, wherein encoding is accomplished by a laser or punching die inscription on the compaction rams or die-plates.

* * * * *